US012593311B2

(12) United States Patent
Lin

(10) Patent No.: US 12,593,311 B2
(45) Date of Patent: Mar. 31, 2026

(54) USER EQUIPMENT AND SIDELINK RESOURCE EXCLUSION METHOD

(71) Applicant: GUANGDONG OPPO MOBILE TELECOMMUNICATIONS CORP., LTD., Dongguan (CN)

(72) Inventor: Huei-Ming Lin, Taipei (TW)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 464 days.

(21) Appl. No.: 17/899,054

(22) Filed: Aug. 30, 2022

(65) Prior Publication Data
US 2022/0417910 A1     Dec. 29, 2022

Related U.S. Application Data

(63) Continuation of application No. PCT/CN2021/082688, filed on Mar. 24, 2021.
(Continued)

(51) Int. Cl.
*H04W 72/02* (2009.01)
*H04W 72/0446* (2023.01)
(Continued)

(52) U.S. Cl.
CPC ....... *H04W 72/02* (2013.01); *H04W 72/0446* (2013.01); *H04W 72/0453* (2013.01); *H04W 72/20* (2023.01)

(58) Field of Classification Search
CPC .... H04L 5/0007; H04L 5/0037; H04W 72/02; H04W 72/0446; H04W 72/0453;
(Continued)

(56) References Cited

U.S. PATENT DOCUMENTS

2019/0191461 A1* 6/2019 Lee ...................... H04W 72/12
2019/0208441 A1   7/2019 Wang et al.
(Continued)

FOREIGN PATENT DOCUMENTS

CN      110447294 A     11/2019
EP        3806558 A1     4/2021
WO   2020063403 A1     4/2020

OTHER PUBLICATIONS

International Search Report Dated May 27, 2021 from PCT Application No. PCT/CN2021/082688.
(Continued)

*Primary Examiner* — Thomas R Cairns
*Assistant Examiner* — Kai Chang
(74) *Attorney, Agent, or Firm* — Quarles & Brady LLP

(57) ABSTRACT

A user equipment (UE) and a sidelink resource exclusion method are provided. The sidelink resource exclusion method includes identifying a first sidelink resource selected by the UE or reserved by a peer UE in a first slot from a candidate resource set in a resource selection window and in a first sidelink resource pool and excluding the first sidelink resource and/or sidelink subchannels in the first slot from the candidate resource set. This can solve issues in the prior art, increase a number of available resources that can be selected from the remaining candidate resource set, reduce interference to other transmissions in the same sidelink resource pool, reduce probability of transmission (Tx) collisions with other UEs, provide a good communication performance, and/or provide high reliability.

18 Claims, 5 Drawing Sheets

Related U.S. Application Data

(60) Provisional application No. 63/006,346, filed on Apr. 7, 2020.

(51) Int. Cl.
    *H04W 72/0453* (2023.01)
    *H04W 72/20* (2023.01)

(58) Field of Classification Search
    CPC ... H04W 72/20; H04W 72/40; H04W 72/541;
    H04W 92/18
    See application file for complete search history.

(56) References Cited

U.S. PATENT DOCUMENTS

| | | | |
|---|---|---|---|
| 2019/0306923 A1 | 10/2019 | Xiong et al. | |
| 2019/0387377 A1 | 12/2019 | Zhang et al. | |
| 2019/0394786 A1* | 12/2019 | Parron | H04W 4/46 |
| 2020/0029245 A1 | 1/2020 | Khoryaev et al. | |
| 2020/0112982 A1* | 4/2020 | Li | H04W 72/23 |
| 2020/0314803 A1* | 10/2020 | Zhang | H04W 74/006 |
| 2021/0227604 A1* | 7/2021 | Huang | H04W 40/248 |
| 2021/0250772 A1* | 8/2021 | Farag | H04W 16/02 |
| 2021/0250954 A1* | 8/2021 | Li | H04W 72/56 |
| 2021/0307032 A1* | 9/2021 | Osawa | H04W 72/569 |
| 2021/0314916 A1* | 10/2021 | Fouad | H04W 72/02 |
| 2022/0279487 A1* | 9/2022 | Ding | H04W 72/40 |
| 2022/0330038 A1* | 10/2022 | Ganesan | H04W 52/383 |
| 2023/0171799 A1* | 6/2023 | Guo | H04W 72/54 |
| | | | 370/329 |

OTHER PUBLICATIONS

International Written Opinion Dated May 27, 2021 from PCT Application No. PCT/CN2021/082688.

Qualcomm Incorporated, "Sidelink Resource Allocation Mechanism for NR V2X", 3GPP TSG RAN WG1 Meeting #100-e R1-2000963,Mar. 6, 2020 (Mar. 6, 2020), the whole document.

The supplementary European search report dated Aug. 8, 2023 from European patent Application No. 21785031.2.

Supplementary European Search Report for European Application No. 21785031.2 dated Oct. 17, 2025.

"Mode 2 resource allocation schemes on sidelink" of ZTE et al., 3GPP TSG RAN WG1 #98 R1-1908795 dated Aug. 26, 2019.

* cited by examiner

30

610

612

Identifying a first sidelink resource selected by the UE or reserved by a peer UE in a first slot from a candidate resource set in a resource selection window and in a first sidelink resource pool

614

Excluding the first sidelink resource and/or sidelink subchannels in the first slot from the candidate resource set

USER EQUIPMENT AND SIDELINK RESOURCE EXCLUSION METHOD

CROSS REFERENCE

This application is a continuation of an International Application No. PCT/CN2021/082688, entitled "USER EQUIPMENT AND SIDELINK RESOURCE EXCLUSION METHOD", filed on Mar. 24, 2021, which claims the benefit of priority to U.S. Provisional Application No. 63/006,346, filed Apr. 7, 2020, both of which are incorporated herein by reference in their entireties.

BACKGROUND OF DISCLOSURE

1. Field of the Disclosure

The present disclosure relates to the field of communication systems, and more particularly, to user equipment (UE) and a sidelink resource exclusion method, which can provide a good communication performance and/or provide high reliability.

2. Description of the Related Art

In the development of a new sidelink (SL) transmission system based on the latest 5th generation-new radio (5G-NR) mobile technology for vehicle-to-everything (V2X) radio communication directly between user equipments (UE), one of the most challenging tasks in the design is supporting UEs to operate autonomously almost entirely on its own with minimum (pre-)configurations and sometimes without any assistance from a mobile network. That is, for any SL UE to operate in this autonomous mode (as known as mode 2), it is able to detect and decode each other's messages, and select resources individually to transmit its own message to others while meeting the required performance in reliability and latency.

However, when there are many UEs operating SL communications at the same time and sharing the same radio carrier and mode 2 resource pool, it is difficult to avoid transmission (Tx) collisions among the UEs and maintaining the required target performance. Furthermore, due to the nature of UE autonomous selection of SL resources in mode 2, it is possible for UEs to announce and reserve one or more resource(s) in advance for their own future transmissions. Therefore, in order for a SL Tx-UE to select appropriate resources and/or avoid selecting resource that have already been reserved by others, the Tx-UE needs to sense/monitor resource allocation information sent from others during a sensing window and exclude SL resources from a candidate resource set before selection. If another UE missed to detect an SCI indicating/reserving SL resources for the first time, it will have no resource allocation knowledge/information on any of the periodically reserved resources. Then these resources will not be excluded from the candidate resource set and still considered to be available for selection. Therefore, it is necessary and beneficial to enhance the current resource exclusion procedure.

Therefore, there is a need for a user equipment (UE) and a sidelink resource exclusion method, which can solve issues in the prior art, increase a number of available resources that can be selected from the remaining candidate resource set, reduce interference to other transmissions in the same sidelink resource pool, reduce probability of transmission (Tx) collisions with other UEs, provide a good communication performance, and/or provide high reliability.

SUMMARY

An object of the present disclosure is to propose a user equipment (UE) and a sidelink resource exclusion method, which can solve issues in the prior art, increase a number of available resources that can be selected from the remaining candidate resource set, reduce interference to other transmissions in the same sidelink resource pool, reduce probability of transmission (Tx) collisions with other UEs, provide a good communication performance, and/or provide high reliability.

In a first aspect of the present disclosure, a user equipment (UE) includes a memory, a transceiver, and a processor coupled to the memory and the transceiver. The processor is configured to identify a first sidelink resource selected by the UE or reserved by a peer UE in a first slot from a candidate resource set in a resource selection window and in a first sidelink resource pool, and the processor is configured to exclude the first sidelink resource and/or sidelink subchannels in the first slot from the candidate resource set.

In a second aspect of the present disclosure, a sidelink resource exclusion method of a user equipment includes identifying a first sidelink resource selected by the UE or reserved by a peer UE in a first slot from a candidate resource set in a resource selection window and in a first sidelink resource pool and excluding the first sidelink resource and/or sidelink subchannels in the first slot from the candidate resource set.

In a third aspect of the present disclosure, a non-transitory machine-readable storage medium has stored thereon instructions that, when executed by a computer, cause the computer to perform the above method.

In a fourth aspect of the present disclosure, a chip includes a processor, configured to call and run a computer program stored in a memory, to cause a device in which the chip is installed to execute the above method.

In a fifth aspect of the present disclosure, a computer readable storage medium, in which a computer program is stored, causes a computer to execute the above method.

In a sixth aspect of the present disclosure, a computer program product includes a computer program, and the computer program causes a computer to execute the above method.

In a seventh aspect of the present disclosure, a computer program causes a computer to execute the above method.

BRIEF DESCRIPTION OF DRAWINGS

In order to illustrate the embodiments of the present disclosure or related art more clearly, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION OF EMBODIMENTS

Figure 1:
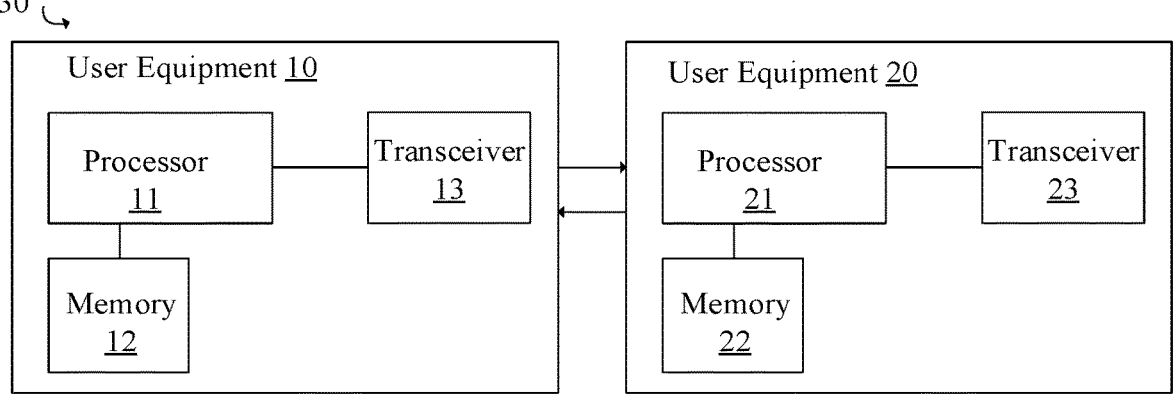
FIG. 1 is a block diagram of user equipments (UEs) of communication in a communication network system according to an embodiment of the present disclosure.

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

According to the current resource exclusion design, it is only possible for a Tx-UE to exclude resources that are reserved using sidelink control information (SCI) based on future indication in slots that are monitored by the Tx-UE during the sensing window. In other slots where the Tx-UE has its own SL or UL transmissions and not be able to monitor or tried to decode physical sidelink control channel (PSCCH) (as known as half-duplex issue/not listening while talking) for any of the subchannels during the sensing window, the Tx-UE excludes all subchannels in all allowed periodically appearing slots within the candidate resource set. This periodicity can include among others any values within a range of 1:99 ms, and up to 16 values can be (pre-)configured per SL mode 2 resource pool.

If a missed SL subchannel is used by another UE (and not being detected by the Tx-UE), there is only one reservation periodicity value used by the other UE, and not all 16 values. Therefore, this blind and blanket approach will inevitably result in excessive exclusion of SL resources/subchannels and it can further lead to lack of candidate resources for selection. Subsequently, the Tx-UE is forced to apply 3 dB increment to a reference signal received power (RSRP) resource exclusion threshold in order to meet the requirement of 20% available resources. Consequently, this allows the inclusion of resources for higher priority transmission as part of candidate resources set reporting to the higher layer for the final selection of resource(s) by the Tx-UE. As such, increased in risk of collision for higher priority transmissions. Additionally, with a smaller number of available candidate resources, this will result in higher channel busy ratio (CBR) and channel resource (CR) measurements. As such, with higher resource congestion the more chance to drop/skip SL transmissions or forced the Tx-UE to select a higher modulation and coding scheme (MC S) level or adjust its transmission power. All of these are undesirable consequences and will lead to inferior communication performance.

For the existing resource indication mechanism used in SCI format 0-1, it is possible to indicate up to 3 SL resources (where each resource includes one or more SL subchannels), one for the current PSCCH/physical sidelink shared channel (PSSCH) transmission (in the same slot where the SCI is received) and two for future PSCCH/PSSCH transmissions (within 32 slots from the current transmission). With this, it is possible for a UE to reserve/book future and periodically occurring SL resources, and other UEs can avoid selecting the same resources or exclude these resources from selection. However, if another UE missed to detect an SCI indicating/reserving SL resources for the first time, it will have no resource allocation knowledge/information on any of the periodically reserved resources. Then these resources will not be excluded from the candidate resource set and still considered to be available for selection. Therefore, it is necessary and beneficial to enhance the current resource exclusion procedure.

FIG. 1 illustrates that, in some embodiments, one or more user equipments (UEs) 10 and one or more user equipments (UEs) 20 of communication in a communication network system 30 according to an embodiment of the present disclosure are provided. The communication network system 30 includes one or more UEs 10 and one or more UE 20. The UE 10 may include a memory 12, a transceiver 13, and a processor 11 coupled to the memory 12 and the transceiver 13. The UE 20 may include a memory 22, a transceiver 23, and a processor 21 coupled to the memory 22 and the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

The communication between UEs relates to vehicle-to-everything (V2X) communication including vehicle-to-vehicle (V2V), vehicle-to-pedestrian (V2P), and vehicle-to-infrastructure/network (V21/N) according to a sidelink technology developed under 3rd generation partnership project (3GPP) long term evolution (LTE) and new radio (NR) Release 16 and beyond. UEs are communicated with each other directly via a sidelink interface such as a PC5 interface. Some embodiments of the present disclosure relate to sidelink communication technology in 3GPP NR release 16 and beyond. Some embodiments of the present disclosure relate to mobile cellular communication technology in 3GPP NR Release 16 and beyond for providing multicast and broadcast services.

In some embodiments, the UE 10 may be a sidelink packet transport block (TB) transmission UE (Tx-UE). The UE 20 may be a sidelink packet TB reception UE (Rx-UE) or a peer UE. The sidelink packet TB Rx-UE can be configured to send ACK/NACK feedback to the packet TB Tx-UE. The peer UE 20 is another UE communicating with the Tx-UE 10 in a same SL unicast or groupcast session.

In some embodiments, the processor 11 is configured to identify a first sidelink resource selected by the UE 10 or reserved by a peer UE 20 in a first slot from a candidate resource set in a resource selection window and in a first sidelink resource pool, and the processor 11 is configured to exclude the first sidelink resource and/or sidelink subchannels in the first slot from the candidate resource set. This can solve issues in the prior art, increase a number of available resources that can be selected from the remaining candidate resource set, reduce interference to other transmissions in the same sidelink resource pool, reduce probability of transmission (Tx) collisions with other UEs, provide a good communication performance, and/or provide high reliability.

Figure 2:
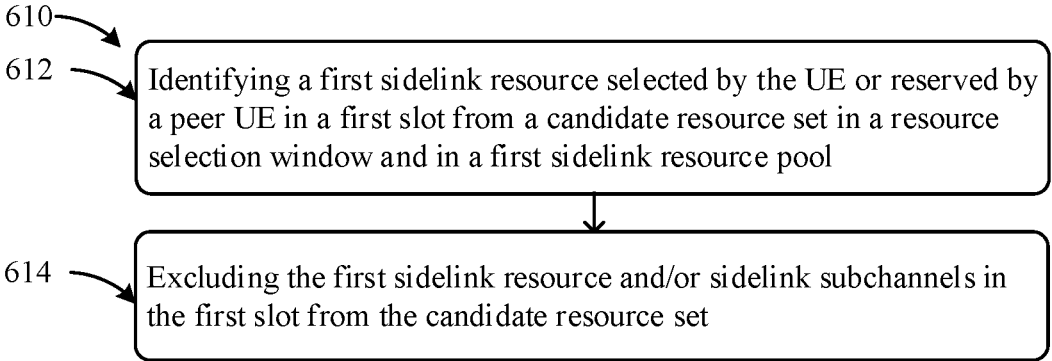
FIG. 2 is a flowchart illustrating a sidelink resource exclusion method of a UE according to an embodiment of the present disclosure.

FIG. 2 illustrates a sidelink resource exclusion method 610 of a user equipment according to an embodiment of the present disclosure. In some embodiments, the method 610 includes: a block 612, identifying a first sidelink resource selected by the UE or reserved by a peer UE in a first slot from a candidate resource set in a resource selection window and in a first sidelink resource pool, and a block 614, excluding the first sidelink resource and/or sidelink subchannels in the first slot from the candidate resource set. This can solve issues in the prior art, increase a number of available resources that can be selected from the remaining candidate resource set, reduce interference to other transmissions in the same sidelink resource pool, reduce probability of transmission (Tx) collisions with other UEs, provide a good communication performance, and/or provide high reliability.

In some embodiments, the first sidelink resource pool comprises a selected/mode 2 sidelink resource pool. In some embodiments, the processor 11 is further configured to identify a second sidelink resource selected by the UE 10 or reserved by the peer UE 20 in a slot that is time overlapped with one or more second slots in the candidate resource set. In some embodiments, the processor 11 is further configured to exclude sidelink subchannels in the one or more second slots from the candidate resource set. In some embodiments, the peer UE 20 is from the same sidelink unicast or groupcast session and determined based on a source identifier (ID) and/or a destination ID from a received sidelink control information (SCI). In some embodiments, the processor 11 is further configured to perform monitoring on configured slots of the first sidelink resource pool by decoding a physical sidelink control channel (PSCCH) and measuring a reference signal received power (RSRP) within a sensing window.

In some embodiments, the processor 11 is further configured to exclude sidelink subchannels from the candidate resource set according to one or more of the followings: an indicated resource reservation period in a SCI during the sensing window; a subset of configured reservation periodicities allowed for the first sidelink resource pool in non-monitored slots during the sensing window; or one or more time overlapping slots of one or more transmissions from the UE and/or one or more transmissions from the peer UE 20. In some embodiments, the processor 11 is further configured to select one or more sidelink resources from a remaining candidate resource set for a PSCCH transmission and/or a physical sidelink shared channel (PSSCH) transmission. In some embodiments, the SCI during the sensing window in a sidelink resource exclusion part comprises one or more of the followings: a frequency allocation information for assigned sidelink resources; or a time allocation information for assigned current, earlier, and/or future sidelink transmissions. In some embodiments, the frequency allocation information for the assigned sidelink resources comprises a starting sidelink subchannel and a number of sidelink subchannels.

In some embodiments, the time allocation information for assigned current, earlier, and/or future sidelink transmissions comprises a number of sidelink transmissions and time gaps of the sidelink transmissions. In some embodiments, the assigned earlier sidelink transmission is enabled or disabled using pre-defined or configured initial scrambling IDs for PSCCH demodulation reference signal (DMRS) or radio network temporary identifier (RNTI) values for PSCCH cyclic redundancy check (CRC) scrambling. In some embodiments, an indicated earlier sidelink resource is enabled and when a number of indicated sidelink resources in the SCI is 2, one of the indicated sidelink resources is for the assigned current sidelink transmission and the other one of the indicated sidelink resources is for the assigned earlier transmission. In some embodiments, an indicated earlier sidelink resource is enabled and when a number of indicated sidelink resources in the SCI is 3, the first indicated sidelink resource is for the assigned earlier sidelink transmission, the second indicated sidelink resource is for the assigned current sidelink transmission, and the third indicated sidelink resource is for the assigned future transmission.

In some embodiments, a subset of configured resource reservation periodicities in the sidelink resource exclusion part comprises one or more of the followings: a subset of one of the resource reservation periodicities in a first configured parameter; or a subset of designated or most used periodicity values from the first configured parameter. In some embodiments, the first configured parameter comprises a parameter, reservationPeriodAllowed. In some embodiments, the subset of one of the resource reservation periodicities in the first configured parameter refers one or more of the followings: a default, which is a designated or most used periodicity value from the first configured parameter; or an indicated reservation periodicity value, if present, in the SCI from the UE during the sensing window.

In some embodiments, the processor 11 is further configured to exclude sidelink subchannels in slots that are overlapped with one or more own transmissions and/or one or more peer transmissions from the candidate resource set in the sidelink resource exclusion part. In some embodiments, one or more time overlapping slots of the one or more own transmissions comprise selected sidelink resources from hybrid automatic repeat request (HARQ) processes, resource pools, and/or multi-carrier selection that fall within a duration of the candidate resource set. In some embodiments, one or more time overlapping slots of the one or more peer transmissions comprise peer UEs 20 from the same sidelink unicast and/or groupcast sessions, and transmissions of the peer UEs 20 fall within a duration of the candidate resource set. In some embodiments, each of the peer UEs 20 is determined based on a source ID and/or a destination ID from the SCI during the sensing window.

In some embodiments, for the present inventive real and predictive-based strategy for sidelink (SL) resource exclusion, it mitigates the problem of excessive exclusion in the existing design by only excluding resources that are actually necessary to be excluded or based on a predictive manner, and apply no exclusion when it is not needed. In some embodiments, the proposed resource exclusion method also reduces the need for the transmission user equipment (Tx-UE) to apply 3 dB increment of RSRP threshold to take-over or to pre-empt already reserved resources from other UEs. Furthermore, in some embodiments, the proposed exclusion method includes also excluding resources that overlap with its own and peer transmissions to avoid the half-duplexing issue and splitting UE total power between multiple time overlapping transmissions, which can reduce SL signal coverage and reception reliability. In some embodiments, other benefits of adopting the proposed resource exclusion method in sidelink mode 2 communication include maximizes number of available resources that can be selected from the remaining candidate resource set, minimizes interference to other transmissions in the same resource pool, and minimizes the probability of transmission (Tx) collisions with other UEs.

In some embodiments, in an inventive method for resource exclusion, primarily intended for new radio-sidelink (NR-SL) communication, a Tx-UE excludes one or more SL resources from a candidate resource set according to a sidelink control information (SCI) received in at least one PSCCH during a sensing window, a subset of (pre-) configured resource reservation periodicities, and/or one or more of its own or peer selected resources for SL transmissions that overlap in time. By excluding SL resources/subchannels according to these proposed schemes, it mitigates the problem of excessive exclusion in the existing design, maximizes the number of available candidate resources that can be selected from and ensures adequate SL transmission power can be allocated from avoiding selecting resources that have already been announced/reserved by other UEs (including both received and mis-detected cases) and overlap with already pre-selected from other selection processes.

Figure 3:
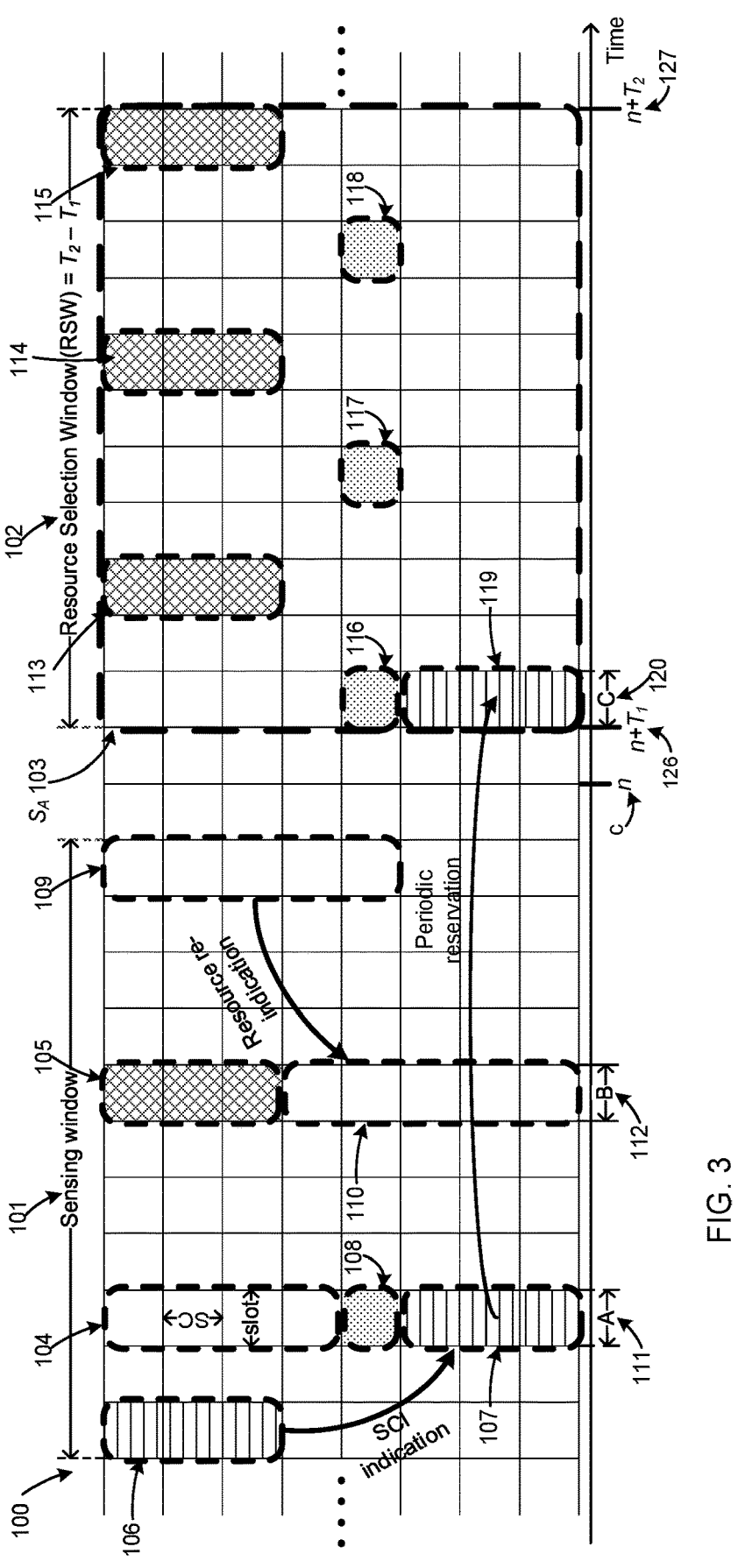
FIG. 3 is a schematic diagram illustrating an exemplary illustration of a proposed resource exclusion for subchannels in non-monitored slots according to an embodiment of the present disclosure.

FIG. 3 illustrates an exemplary illustration of a proposed resource exclusion for subchannels in non-monitored slots according to an embodiment of the present disclosure. In some embodiments, for the proposed resource exclusion schemes and in reference to diagram 100 in FIG. 3, a Tx-UE first receives a network configuration or obtains a pre-configuration signalling containing information for a SL "selected" (as know as mode 2) transmission resource pool and an RSRP threshold for each pair of transmission and reception priority levels. The Tx-UE performs SL resource sensing/monitoring slots which belong to the (pre-)configured resource pool within a sensing window 101. The resource sensing/monitoring operation comprises decoding physical sidelink control channel (PSCCH) to extract information on one or more of time and frequency resource assignments for current and other intended/reserved resources, resource reservation period (if present) and L1 priority from the received SCI format 0-1, and measuring RSRP levels for the received SCI in these slots. The Tx-UE determines a set of slots, which represents a resource selection window (RSW) 102 between n+T₁ 126 and n+T₂ 127, for the (pre-)configured sidelink selected/mode 2 resource pool after a resource allocation procedure trigger at time n 128, and also sets up/initializes a candidate resource set for the RSW, S_A 103, containing all applicable SL resources with suitable sub-channel size for transmitting physical sidelink shared channel (PSSCH) and PSCCH. Then for the SL said proposed resource exclusion method, it comprises one or a combination of the following schemes.

Scheme 1 (for Non-Monitored Slots):

In some embodiments, as one of the schemes in the invented resource exclusion method, scheme 1 is proposed to handle resource exclusion for SL resources/subchannels in slots within the sensing window that are not monitored by the Tx-UE. These slots not monitored by the Tx-UE could be due to the half-duplexing constraint that a UE cannot simultaneously transmit and receive at the same time (e.g. in the same slot). In order to avoid from the existing mode 2 resource exclusion design where excessive and unnecessary exclusions that will resulting in inadequacy of available subchannels for the resource selection and subsequently forcing the Tx-UE to increase RSRP thresholds by 3 dB or more in order to meet a certain percentage of remaining candidate resources requirement, it is proposed as part of scheme 1 to exclude resources from the candidate resource set (S_A) according to the followings.

In some embodiments, for subchannels in slots within the sensing window that are not monitored by the Tx-UE, one or more of the followings is provided.

If one or more subchannels in these slots are indicated or re-indicated in SCI from another UE, the corresponding subchannel(s) in the subsequent periodically occurring instances according to the "Resource reservation period" field (if present in SCI) that fall within the candidate resource set (S_A) are excluded.

If one or more subchannels in these slots are indicated or re-indicated in SCI from another UE, and if the "Resource reservation period" field is not present in SCI or set to not periodically occurring (e.g. zero, reserved or n/a), then no subchannels are periodically excluded from the candidate resource set according to the periodicity values allowed by the (pre-)configured parameter "reservationPeriodAllowed".

For all other subchannels that are not indicated or re-indicated in SCI from another UE, their corresponding subchannels in the periodically occurring instances based on a subset of the (pre-)configured parameter "reservationPeriodAllowed" and fall within the candidate resource set are excluded. The subset could be one or more values (but not all) from the parameter "reservationPeriodAllowed", that represent the most used reservation periodicities (e.g. 20, 50, or 100 ms). The subset can be defined as a default, designated or the indicated/re-indicated reservation periodicity value in SCI (if present) from own or other transmissions.

Note that, the proposed scheme 1 is applied to a SL selected/mode 2 resource pool with a (pre-)configured RRC parameter "reserveResourceDifferentTB" set to enabled.

In reference to diagram 100 of FIG. 3, an exemplary illustration of scheme 1 of the proposed resource exclusion method is depicted for subchannels in non-monitored slots within a sensing window. In some embodiments, In the illustration 100, a Tx-UE is configured to trigger a resource allocation procedure to select suitable resource(s) from a candidate resource set S_A 103 within a RSW from n+T₁ 126 to n+T₂ 127 based on the outcome of resource sensing/monitoring within a sensing window 101. Within the sensing window 101, let's assume that the Tx-UE is configured to perform a SL transmission using resource 104 in slot A 111 and an UL transmission in slot B 112. As such, the Tx-UE could not perform monitoring of potential transmissions in other subchannels of these two slots due to the half-duplexing constraint described earlier. However, based on a decoded PSCCH from an early slot, the Tx-UE obtains time and frequency resource assignment indications in a SL resource 106 for a SL transmission in slot A 111 using a SL resource 107, and a "resource reservation period" value from the received SCI format 0-1. Then based on the "resource reservation period" value, the Tx-UE also determines that a periodic SL transmission instance will occur in a SL resource 119 in slot C 120 within the candidate resource set S_A 103.

In some embodiments, according to scheme 1 of the proposed resource exclusion method, the subchannels that correspond to a SL resource 119 are excluded from the candidate resource set. Furthermore, the Tx-UE based on the SCI format 0-1 received in a SL resource 109 within the sensing window 101, obtains time and frequency assignment "re-indication" to an earlier/used SL resource 110 in slot B 112. In some embodiments, in the received SCI in SL resource 109, the Tx-UE also obtains a "resource reservation period" parameter but with a value zero, and from which the Tx-UE determines there is no periodic reservation of the same SL resource in the future slots, so it does not exclude any subchannels from the candidate resource set $S_A$ 103 that are relating to the subchannels in SL resource 110. Lastly, for all subchannels within the remaining resources 108 and 105 within that are not indicated or re-indicated in SCI from another UE, their periodic occurring subchannels in SL resources 113, 114, 115, 116, 117, and 118 within the candidate resource set $S_A$ 103 are subsequently excluded, where the periodic value applied for subchannels of SL resource 105 is the default value of a (pre-)configured RRC parameter "reservationPeriodAllowed" for the selected/mode 2 resource pool, and the periodic value applied for subchannels of SL resource 108 is the "resource reservation period" value indicated in SCI format 0-1 from the Tx-UE's own transmission in SL resource 104.

Scheme 2 (for Mis-Detected PSCCH in Monitoring Slots):

In some embodiments, as another one of the schemes in the invented resource exclusion method, scheme 2 is proposed to handle resource exclusion for subchannels in slots where the Tx-UE performed sensing/monitoring but does not successfully decode PSCCH to obtain resource allocation information (e.g. missed detection due to low signal power or bad channel condition). According to the existing resource signaling mechanism, unless the Tx-UE has detected a prior indication of SL transmission(s) intended for subchannels where the mis-detection of PSCCH happened and able to subsequently exclude their periodically occurring resources within the candidate resource set, so far there is no other mechanism for the Tx-UE to perform such resource exclusion if there is no prior signaling. Therefore, in order to avoid the described under exclusion of resources due to missed detections and subsequently causing Tx collisions and creating interference to other transmissions, as part of scheme 2 for the invented resource exclusion method, it is proposed to allow for a SL UE to re-indicate utilizing the existing frequency and time resource assignment fields in SCI of an earlier used resource that is within 32 slots of the current transmission. This re-indication of an earlier used resource operation is restricted to selected/mode 2 resource pools with "reserveResourceDifferentTB" set to enabled and/or when the "Resource reservation period" field in SCI format 0-1 is present and set to a none-zero value.

As the re-indication of an earlier used resource operation is different to the existing SCI signaling mechanism for reserving future resources, in order to for a Tx-UE to distinguish between the two during resource allocation signaling, the Tx-UE uses one of the two following methods for enabling/disabling the proposed "re-indication of earlier/used resource" in SCI:

1. Different scrambling initialization IDs for PSCCH demodulation reference signal (DMRS) are pre-defined or (pre-)configured.

2. Different radio network temporary identifier (RNTI) values for cyclic redundancy check (CRC) scrambling of SCI are pre-defined or (pre-)configured.

When the re-indication of earlier used resource feature is set to enabled/true, the Tx-UE signals resource assignment information in the SCI as followed.

When the Tx-UE signals 2 SL transmission resources/opportunities in the SCI, besides the SL resource for the current transmission, the other resource is for re-indication to an earlier transmission. This is typically useful for the last retransmission of a TB, where there is no need to indicate anymore future resources.

When the Tx-UE signals 3 SL transmission resources/opportunities in the SCI, the first resource is for re-indication to an earlier used transmission, the second resource is for indication of the current transmission, and the third resource is for indication of the next transmission.

When the resource re-indication of earlier used resource feature is set to disabled/false, the first resource is for indication of the current transmission, and the other resource(s) is for indication of subsequent one or two transmission(s).

Figure 4:
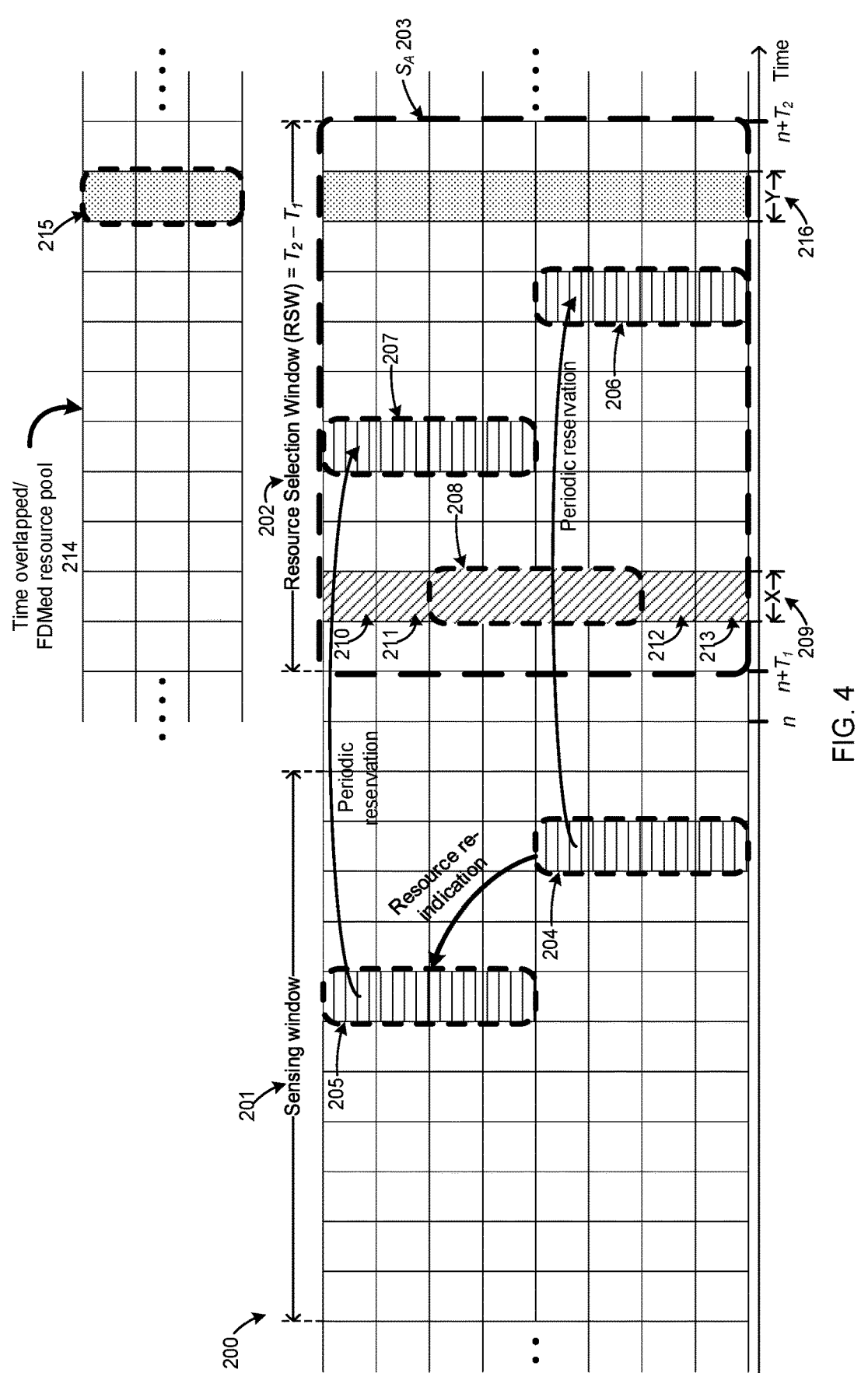
FIG. 4 is a schematic diagram illustrating an exemplary illustration of a proposed resource exclusion scheme in slots of own, periodic, and/or time overlapped transmissions according to an embodiment of the present disclosure.

FIG. 4 illustrates an exemplary illustration of a proposed resource exclusion scheme in slots of own, periodic, and/or time overlapped transmissions according to an embodiment of the present disclosure. In reference to diagram 200 in FIG. 4, an exemplary illustration of scheme 2 of the proposed resource exclusion method is depicted for sidelink resource exclusion from a UE candidate resource set based on the above described "re-indication of an earlier used resource" feature. In the illustration 200, a Tx-UE triggers a resource allocation procedure to select suitable resource(s) from a candidate resource set $S_A$ 203 within an RSW 202 from $n+T_1$ to $n+T_2$ based on the outcome of resource sensing/monitoring within a sensing window 201. Within the sensing window 201, the Tx-UE does not detect any SCI and failed to decode PSCCH transmitted in any of the subchannels in SL resource 205. This mis-detection may be due to any of low received signal power, high interference environment and/or severe channel fading.

In moments later still within the sensing window 201, the Tx-UE detects and decodes a PSCCH transmitted in SL resource 204 with the re-indication to an earlier used resource feature enabled in SCI and points to SL resource 205 that is mis-detected by the Tx-UE earlier. And based on the resource reservation period value signaled in the received SCI from SL resource 204, the Tx-UE is able to determine within the candidate resource set $S_A$ 203 that SL resource 206, which corresponds to SL resource 204, is periodically reserved and the Tx-UE excludes all subchannels within SL resource 206 from the candidate resource set $S_A$ 203. Similarly based on the resource reservation period value signaled in the received SCI from SL resource 204, the Tx-UE is able to determine within the candidate resource set $S_A$ 203 that SL resource 207, which corresponds to the mis-detected SL resource 205, is periodically reserved and the Tx-UE excludes all subchannels within SL resource 207 from the candidate resource set $S_A$ 203.

Scheme 3 (for Own and/or Peer Transmissions in Candidate Resource Slots):

In some embodiments, as another one of the schemes in the invented resource exclusion method, scheme 3 is proposed to handle resource exclusion of subchannels in slots within the candidate resource set $S_A$ where the resource selecting UE has its own and/or peer transmission(s). During the resource exclusion or selection part of resource allocation procedure in mode 2, a resource selecting UE considers of its own and/or peer's future transmission(s) and exclude SL resources/subchannels in slots that overlap in time with these transmission(s) from the candidate resource set. This is even to avoid selecting the same or overlapping resources that have already been selected previously for another SL transmission process. Often due to limitations of transmission capability for a UE (e.g., number of antennas, available/remaining power and Tx/Rx switching) or unable to fulfill certain transmit signal quality requirements (e.g., error vector magnitude (EVM) or emitting signals with high peak-to-average-power-ratio (PAPR)), it is not feasible for a UE to perform multiple SL transmissions over different SL resources simultaneously. As such, during the resource selection procedure, any SL resources/subchannels that overlap in time with resource selection UE's own transmissions (e.g., due to a parallel selection process), the UE should exclude any of these SL resources/subchannels form the candidate resource set $S_A$. Note that the parallel selection process includes SL resource selection from multi-HARQ processes, multi-carrier operation, and resource selection over multiple SL resource pools (e.g., frequency domain multiplexed (FDMed) resource pools).

In some embodiments, in another scenario, a Tx-UE may need to take into account of transmission timing of a peer UE, where the peer UE is another UE communicating with the Tx-UE in a same SL unicast or groupcast session, and to avoid selecting resources that overlap in time with its peer transmission(s), so that they are able to receive each other's transmissions. Therefore, the Tx-UE should exclude any SL resources/subchannels from the candidate resource set $S_A$ in slots that overlap in time with peer's transmission. For the Tx-UE to know which of the future transmissions will be coming from its peer or that the Tx-UE has high interests, the Tx-UE decides based on the source and/or destination IDs from SCI received during the sensing window. When one or both IDs fully or partially match with Tx-UE's peer ID, Tx-UE's own ID, and/or ID of the groupcast session which the Tx-UE belongs to, the Tx-UE determines corresponding transmissions of the same SCI are coming from its peer.

In reference to diagram 200 in FIG. 4, an exemplary illustration of scheme 3 of the proposed resource exclusion method is depicted for sidelink resource exclusion from a UE candidate resource set based on the above described resource exclusion method according to its own and peer transmissions. In some embodiments, In the illustration 200, a Tx-UE identifies that from one of its resource selection processes the Tx-UE has already selected SL resource 208 or one of its peer has already reserved SL resource 208 which happens to be within the same resource selection window 202 and in the same selected/mode 2 SL resource pool. Based on this, the Tx-UE cannot select the same or any other SL resources that overlaps with SL resource 208, and excludes all subchannels in the same slot X 209 from the candidate resource set $S_A$ 203, including SL resource 208 and subchannel 210, 211, 212, and 213. In another exemplary illustration of the proposed resource exclusion scheme based on resource selection UE's own transmission, a Tx-UE identifies that from one of its resource selection processes the Tx-UE has already pre-selected a SL resource 215 from a time overlapped/FDMed resource pool 214, and also that the slot timing of the said previously selected SL resource 215 overlaps with slot Y 216 in the candidate resource set $S_A$ 203. As such, the Tx-UE according to the proposed scheme 3 of the resource exclusion method excludes all SL subchannels in slot Y 216 from the candidate resource set $S_A$ 203.

In summary, in some embodiments, in order for a NR SL terminal to select appropriate SL resources autonomously on its own to transmit PSCCH/PSSCH, it is proposed for the SL communication terminal to use a real and predictive-based resource exclusion strategy to avoid excess exclusion of resources and enhance transmission efficiency and reliability at the same time. In some embodiments, an overall method for resource exclusion in mode 2 NR SL communication comprises one or more of followings:

1. Receiving from network RRC configuration signaling or pre-configuration of a selected/mode2 resource pool for SL transmission. 2. Performing monitoring on (pre-)configured slots of the sidelink selected/mode2 resource pool by decoding PSCCH and measuring RSRP within a sensing window. 3. Excluding sidelink subchannels from a candidate resource set according to one or more of the followings: indicated resource reservation period in received SCI during a sensing window, a subset of (pre-)configured reservation periodicities allowed for the resource pool in non-monitored slots during a sensing window, or time overlapping slot(s) of own and peer transmission(s). 4. Selecting of one or more SL resources from the remaining candidate resource set for PSCCH/PSSCH transmission.

Sidelink control information (SCI) received during a sensing window in the sidelink resource exclusion part comprises one or more of the followings: 1. Frequency allocation information for the assigned SL resources (starting subchannel, number of subchannels). 2. Time allocation information for the assigned current, earlier used, and/or future SL transmissions (number of SL transmission instances and their time gaps). The indication of an earlier used resource is enabled/disabled using pre-defined or (pre-)configured initial scrambling IDs for the PSCCH DMRS or RNTI values for PSCCH CRC scrambling. When the indication of an earlier used resource is enabled and when the number of indicated SL resources in SCI is 2, one of the indicated resources is for the current transmission and the other one is for the earlier transmission. When the indication of an earlier used resource is enabled and when the number of indicated SL resources in SCI is 3, the first indicated resource is for the earlier transmission, the second indicated resource is for the current transmission, and the third indicated resource is for the next transmission.

A subset of (pre-)configured resource reservation periodicities in the sidelink resource exclusion part comprises one or more of the followings: 1, A subset of one of resource reservation periodicities in the (pre-)configured parameter "reservationPeriodAllowed", which could be based on one or a combination of the followings: A default, designated or most used periodicity value from the parameter "reservationPeriodAllowed". The indicated reservation periodicity value, if present, in the transmitted SCI from the Tx-UE during the sensing window. 2. A subset of more than one most used/designated periodicity values from the (pre-)configured parameter "reservationPeriodAllowed".

Excluding all SL subchannels in slots that overlap with own and peer transmission(s) from the candidate resource set in the sidelink resource exclusion part is to avoid simultaneous SL transmissions and the half-duplex issue. Time overlapping slot(s) of own transmissions include pre-selected SL resources from multiple HARQ processes, multiple resource pools, and/or multi-carrier selection that fall within the duration of the candidate resource set. Time overlapping slot(s) of peer transmissions include peers from the same SL unicast and/or groupcast sessions and their transmissions fall within the duration of the candidate resource set. A peer can be determined based on the source and/or destination IDs from SCI received during the sensing window.

Commercial interests for some embodiments are as follows. 1. Solving issues in the prior art. 2. Increasing a number of available resources that can be selected from the remaining candidate resource set. 3. Reducing interference to other transmissions in the same sidelink resource pool. 4. Reducing probability of transmission (Tx) collisions with other UEs. 5. Providing good communication performance. 6. Providing high reliability. 7. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. Some embodiments of the present disclosure are a combination of "techniques/processes" that can be adopted in 3GPP specification to create an end product.

Figure 5:
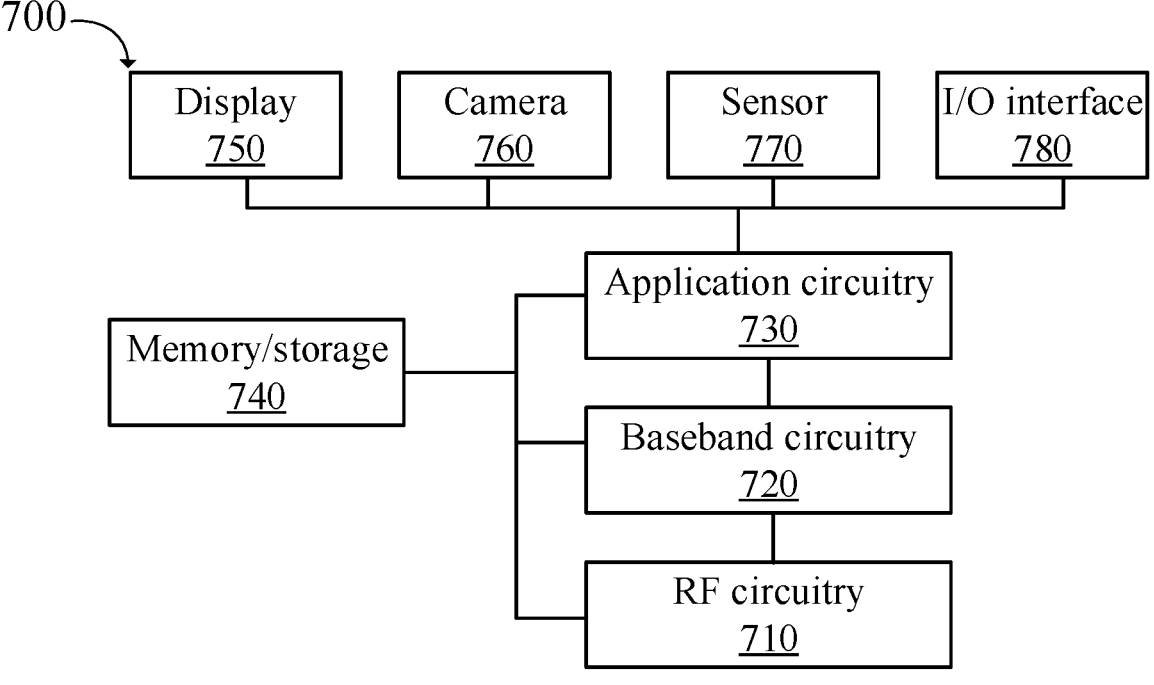
FIG. 5 is a block diagram of a system for wireless communication according to an embodiment of the present disclosure.

FIG. 5 is a block diagram of an example system 700 for wireless communication according to an embodiment of the present disclosure. Embodiments described herein may be implemented into the system using any suitably configured hardware and/or software. FIG. 5 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated.

The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium. In various embodiments, the RF circuitry may include switches, filters, amplifiers, etc. to facilitate the communication with the wireless network.

In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

In some embodiments, some or all of the constituent components of the baseband circuitry, the application circuitry, and/or the memory/storage may be implemented together on a system on a chip (SOC).

The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, a AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan.

A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A user equipment (UE), comprising:
a memory;
a transceiver; and
a processor coupled to the memory and the transceiver;
wherein the processor is configured to identify a first sidelink resource selected by the LE or reserved by a peer LE in a first slot from a candidate resource set in a resource selection window and in a first sidelink resource pool;
wherein the processor is configured to exclude the first sidelink resource and/or sidelink subchannels in the first slot from the candidate resource set,
wherein the processor is further configured to perform monitoring on configured slots of the first sidelink resource pool by decoding a physical sidelink control channel (PSCCH) and measuring a reference signal received power (RSRP) within a sensing window; and wherein the processor is further configured to exclude sidelink subchannels from the candidate resource set according to:
an indicated resource reservation period in a Sidelink Control Information (SCI) during the sensing window; and
a configured subset of allowed reservation periodicities for the first sidelink resource pool in non-monitored slots during the sensing window, wherein a quantity of reservation periodicities in the configured subset is less than a quantity of the allowed reservation periodicities for the first sidelink resource pool.

2. The UE of claim 1, wherein the first sidelink resource pool comprises a selected/mode 2 sidelink resource pool.

3. The UE of claim 1, wherein the processor is further configured to identify a second sidelink resource selected by the UE or reserved by the peer UE in a slot that is time overlapped with one or more second slots in the candidate resource set.

4. The UE of claim 3, wherein the processor is further configured to exclude sidelink subchannels in the one or more second slots from the candidate resource set.

5. The UE of claim 1, wherein the peer UE is from the same sidelink unicast or groupcast session and determined based on a source identifier (ID) and/or a destination ID from a received sidelink control information (SCI).

6. The UE of claim 1, wherein the processor is further configured to exclude sidelink subchannels from the candidate resource set according to
one or more time overlapping slots of one or more transmissions from the UE and/or one or more transmissions from the peer UE.

7. The UE of claim 1, wherein the processor is further configured to select one or more sidelink resources from a remaining candidate resource set for a PSCCH transmission and/or a physical sidelink shared channel (PSSCH) transmission.

8. The UE of claim 1, wherein the SCI during the sensing window in a sidelink resource exclusion part comprises one or more of the followings:
a frequency allocation information for assigned sidelink resources; or
a time allocation information for assigned current, earlier, and/or future sidelink transmissions.

9. The UE of claim 1, wherein the processor is further configured to exclude sidelink subchannels in slots that are overlapped with one or more own transmissions and/or one or more peer transmissions from the candidate resource set in the sidelink resource exclusion part.

10. A sidelink resource exclusion method by a user equipment (UE), comprising:
identifying a first sidelink resource selected by the JE or reserved by a peer UJE in a first slot from a candidate resource set in a resource selection window and in a first sidelink resource pool;
excluding the first sidelink resource and/or sidelink subchannels in the first slot from the candidate resource set;
performing monitoring on configured slots of the first sidelink resource pool by decoding a physical sidelink control channel (PSCCH) and measuring a reference signal received power (RSRP) within a sensing window; and
excluding sidelink subchannels from the candidate resource set according to:

an indicated resource reservation period in a Sidelink Control Information (SCI) during the sensing window; and a configured subset of allowed reservation periodicities for the first sidelink resource pool in non-monitored slots during the sensing window, wherein a quantity of reservation periodicities in the configured subset is less than a quantity of the allowed reservation periodicities for the first sidelink resource pool.

11. The method of claim 10, wherein the first sidelink resource pool comprises a selected/mode 2 sidelink resource pool.

12. The method of claim 10, further comprising identifying a second sidelink resource selected by the UE or reserved by the peer UE in a slot that is time overlapped with one or more second slots in the candidate resource set.

13. The method of claim 12, wherein the UE is further configured to exclude sidelink subchannels in the one or more second slots from the candidate resource set.

14. The method of claim 10, wherein the peer UE is from the same sidelink unicast or groupcast session and determined based on a source identifier (ID) and/or a destination ID from a received sidelink control information (SCI).

15. The method of claim 10, wherein the UE is further configured to exclude sidelink subchannels from the candidate resource set according to one or more time overlapping slots of one or more transmissions from the UE and/or one or more transmissions from the peer UE.

16. The method of claim 10, wherein the UE is further configured to select one or more sidelink resources from a remaining candidate resource set for a PSCCH transmission and/or a physical sidelink shared channel (PSSCH) transmission.

17. The method of claim 10, wherein the SCI during the sensing window in a sidelink resource exclusion part comprises one or more of the followings:

a frequency allocation information for assigned sidelink resources; or a time allocation information for assigned current, earlier, and/or future sidelink transmissions.

18. The method of claim 10, wherein the UE is further configured to exclude sidelink subchannels in slots that are overlapped with one or more own transmissions and/or one or more peer transmissions from the candidate resource set in the sidelink resource exclusion part.

* * * * *